Patented Jan. 21, 1941

2,229,155

UNITED STATES PATENT OFFICE 2,229,155

INDICATOR PAPER

Henry Wenker, Elizabeth, N. J.

No Drawing. Application April 23, 1938,
Serial No. 203,970

6 Claims. (Cl. 23—253)

This invention relates to the production of indicator papers, i. e. carrier papers (or equivalent carrier materials) into which there have been incorporated substances giving visible indication of an environmental change in hydrogen-ion concentration.

Indicator papers are ordinarily prepared by impregnating paper with a solution of an indicator, and drying. Indicators such as litmus become more or less fixed in the paper, and are retained by the paper when it is contacted with a test liquid; but some indicators, notably sodium dinitrophenyl-azo-naphthol-disulfonate (phenaphthazine) and other dyes of the type disclosed in U. S. Patent No. 1,975,340, are not fixed in the paper, and are readily dissolved out by the liquid being tested. When the non-fixed-indicator paper is placed in a test liquid, the indicator colors and contaminates the liquid and the indicator paper is whitened; and when the indicator paper is treated with a test drop, the rapid spreading of the drop carries away some of the indicator leaving a whitened center area, and the test is consequently vitiated. Moreover, indicators such as phenaphthazine are transitory-reading; i. e., in use the original color changes to a significant color (indicating the pH) and then to a non-significant color; and these color changes may occur too rapidly for reliable reading of the significant color.

As used hereinafter in the specification and claims, the term "non-fixed" designates a type of indicator in the same sense that it designates a type of dye in the dyeing art; and the term "transitory-reading" designates a type of indicator which, in use, changes first to a significant color (indicating the pH) and then to a non-significant color.

It is the object of this invention to provide a carrier paper embodying. a non-fixed and/or transitory-reading indicator which will not readily lose its indicator to the liquid being tested and which will give easily readable and reliable color changes.

In the practice of this invention, a carrier paper embodying a non-fixed and/or transitory-reading indicator is lightly impregnated with an inert, neutral, water-repellent material, preferably a mineral wax (e. g. paraffin wax or ceresin). This material serves to retard solution of the indicator from the paper by the test liquid, and also favors the formation of and retards the absorption of test drops, thus increasing the reliability of the color reaction. Moreover, the water-repellent material forms a coating which aids in protecting the indicator against exposure to air and other deleterious contacts, such as non-neutral surfaces of paper envelopes and glass vials.

The impregnation is effected by treating the indicator paper with a dilute solution of the water-repellent material in a volatile solvent, e. g. a dilute carbon tetrachloride solution of paraffin wax. The impregnation should, of course, be light, since a heavy impregnation (i. e., a heavy coating) might water-proof the paper or decrease the absorption of test liquid to such an extent that the indicator would not give the color change within a reasonable time. Concentration of 0.03% to 5.0% have been found satisfactory, the preferred range of concentrations being 0.12% to 2.0%.

In addition to paraffin wax and ceresin, the following inert, neutral, water-repellent materials, inter alia, may be used in the practice of this invention (all, except flexible collodion, being dissolved in volatile solvents): cellulose esters (e. g. cellulose acetate or cellulose nitrate), cellulose ethers (e. g. ethyl cellulose), natural resins (e. g. shellac or rosin), vegetable waxes (e. g. beeswax or carnauba wax), synthetic resins of the thermoplastic type (e. g. copolymerized vinyl acetate and vinyl chloride, polystyrols, or polymeric methyl methacrylates), mixtures such as flexible collodion, and rubber derivatives such as rubber hydrochloride. Among the volatile solvents used are carbon tetrachloride, chloroform, acetone, ethyl alcohol, methyl alcohol, and ethyl ether.

The following example is illustrative of the invention:

Sheets of white filter paper are impregnated with an aqueous solution of phenaphthazine (or other azo dyes of the type disclosed in U. S. Patent No. 1,975,340), and carefully dried. The dried paper is immersed in a 1% solution of paraffin wax in carbon tetrachloride, and again dried. The sheets are then pressed to remove wrinkles, cut into strips, and packaged in sealed containers. These indicator papers function excellently either when placed in a test liquid or treated with a test drop, the color change taking place gradually during the first minute and remaining accurately readable for about another minute.

The invention may be variously otherwise embodied, within the scope of the appended claims.

I claim:

1. In the preparation of an indicator paper, the steps of immersing a carrier paper embodying a non-fixed and transitory-reading indicator in a dilute solution of a wax in a volatile solvent, and removing the solvent.

2. In the preparation of an indicator paper, the steps of immersing a carrier paper embodying a non-fixed and transitory-reading indicator in a 0.3 to 5.0% solution of a wax in a volatile solvent, and removing the solvent.

3. A carrier paper embodying a non-fixed and transitory-reading indicator and lightly impregnated with a wax.

4. A carrier paper embodying a non-fixed and transitory-reading indicator and lightly impregnated with a mineral wax.

5. A carrier paper embodying sodium dinitrophenyl-azo-naphthol-disulfonate as the indicator and lightly impregnated with a mineral wax.

6. A carrier paper embodying a non-fixed indicator and lightly impregnated with a wax.

HENRY WENKER.